(12) United States Patent
Goto et al.

(10) Patent No.: US 6,254,167 B1
(45) Date of Patent: Jul. 3, 2001

(54) WIPER DEVICE FOR VEHICLE

(75) Inventors: Masami Goto; Toshio Kobayashi; Hiroshi Ohsaki; Hiroshi Kojima; Masaaki Shimuba, all of Kanagawa-ken (JP)

(73) Assignees: Nissan Motor Co., Ltd.; Jidosha Denki Kogyo Kabushiki Kaisha, both of Yokohama (JP)

( * ) Notice: Subject to any disclaimer, the term of this patent is extended or adjusted under 35 U.S.C. 154(b) by 0 days.

(21) Appl. No.: 09/190,060

(22) Filed: Nov. 12, 1998

(30) Foreign Application Priority Data

Nov. 11, 1997 (JP) ...................................... 9-308950

(51) Int. Cl.[7] ........................................................ B60S 1/34
(52) U.S. Cl. ........................................ 296/96.15; 15/250.3
(58) Field of Search ................................ 296/96.15, 189; 15/250.3, 250.31

(56) References Cited

U.S. PATENT DOCUMENTS 5,005,897 * 4/1991 Endo et al. .................... 15/250.19 X
5,186,064 * 2/1993 Matsumoto et al. ............ 15/250.3 X
5,634,726 6/1997 Edele et al. ........................... 384/276

FOREIGN PATENT DOCUMENTS

| 1020880 | * 12/1957 | (DE) | .................... 15/250.3 |
| 1816835 | * 7/1969 | (DE) | .................... 15/250.3 |
| 83643 | * 6/1980 | (JP) | .................... 15/250.3 |
| 5-270362 | 10/1993 | (JP) . | |

* cited by examiner

*Primary Examiner*—Dennis H. Pedder
(74) *Attorney, Agent, or Firm*—Foley & Lardner

(57) ABSTRACT

A wiper device for a vehicle disclosed is provided with a wiper motor, a wiper pivot connected to the wiper motor, and a pivot holder having a base portion attached to the vehicle body and a bearing portion connected to the base portion and pivotally supporting the wiper pivot in a rotatable manner. In this case, the wiper pivot can rotate around the pivot axis thereof by using a drive force from the wiper motor, and the wiper pivot extends so as to project toward an outer side of the vehicle body. Then, in the structure mentioned above, it is further constructed in such a manner that at least a part of the bearing portion is released from the vehicle body when a load equal to or more than a predetermined value acts on the wiper pivot so as to move the wiper pivot to the inner portion of the vehicle body.

4 Claims, 4 Drawing Sheets

WIPER DEVICE FOR VEHICLE

The contents of Application No. TOKUGANHEI 9-308950, with a filing date of Nov. 11, 1997 in Japan, are hereby incorporated by reference.

BACKGROUND OF THE INVENTION

1. Field of the Invention

The present invention relates to a wiper device for a vehicle, and particularly to a wiper device for a vehicle preferably usable for a vehicle provided with a structure of a so-called concealed wiper type in which an upper portion of a wiper unit is covered with a rear end portion of an engine hood.

2. Description of the Related Art

In a vehicle provided with the structure of the so-called concealed wiper type disclosed in Japanese Patent Application Laid-Open Publication No. 5-270362, an end portion of an engine hood extends outwardly near a lower side portion of a front window panel, thereby covering an upper portion of a wiper unit.

However, in such a structure, since the rear end portion of the engine hood becomes close to the upper end portion of a wiper pivot of the wiper unit, the rear end portion of the engine hood is brought into contact with the wiper pivot when a collision load acts on the rear end portion of the engine hood from the upper side of the vehicle body downward to the lower side of the vehicle body at a time of a collision of the vehicle or the like, so that the engine hood tends to be prevented from freely deforming downward. That is, such a restriction of the deformation corresponds to a restricting condition in the case of desiring to increase an absorption amount of a collision energy.

SUMMARY OF THE INVENTION

An object of the present invention is to provide a wiper device for a vehicle which can improve an absorption characteristic of a collision energy without substantially restricting a deformation of a rear end portion of an engine hood to a lower side of a vehicle body by means of a wiper pivot when a load due to a collision or the like acts on the rear end portion of the engine hood from an upper side of the vehicle body (corresponding to an outer side of the vehicle body) to the lower side of the vehicle body (corresponding to an inner side of the vehicle body).

That is, the wiper device for the vehicle in accordance with the present invention is provided with a wiper motor, a wiper pivot connected to the wiper motor, and a pivot holder having a base portion attached to the vehicle body and a bearing portion connected to the base portion and pivotally supporting the wiper pivot in a rotatable manner.

In this case, the wiper pivot can rotate around its pivot axis thereof by using a drive force from the wiper motor, and the wiper pivot extends in such a manner as to project toward the outer side of the vehicle body.

Then, in the structure mentioned above, it is further constructed such that at least a part of the bearing portion is released from the vehicle body when a load equal to or more than a predetermined value acts on the wiper pivot, thereby moving the wiper pivot to the inner portion of the vehicle body.

That is, in the wiper for the vehicle in accordance with the present invention, when the load due to a collision or the like acts on the rear end portion of the hood member typically corresponding to an engine hood from the outer side of the vehicle to the inner side thereof, and more particularly, from the upper side of the vehicle body to the lower side thereof, a deformation of the rear end portion of the hood member to the lower portion of the vehicle body is substantially made free by means of the wiper pivot structured in the above manner, thereby improving the absorption characteristic for the collision energy.

In this case, the wiper pivot is covered with the hood member in the outer side of the vehicle, and the load at a time of a collision or the like acts on the wiper pivot through the hood member.

Here, in the wiper device for the vehicle in accordance with the present invention, particularly, it is preferable that the structure where at least a part of the bearing portion is released from the base portion so as to move the wiper pivot to the inner side of the vehicle body when the load equal to or more than the predetermined value acts on the wiper pivot is used, since a simple construction and a certain motion can be obtained.

Further, more particularly, the structure may be made such that the bearing portion has an outer cylinder connected to the base portion and an inner cylinder provided inside the outer cylinder and pivotally supporting the wiper pivot in a rotatable manner, and the inner cylinder is released from the outer cylinder so as to move the wiper pivot to the inner side of the vehicle body when the load equal to or more than the predetermined value acts on the wiper pivot. In accordance with this structure, since a certain motion can be obtained by a simple structure, it is preferable.

In accordance with the structure mentioned above, more particularly, the outer cylinder and the inner cylinder are connected by an engagement between teeth, and the structure may be made in such a manner that the engagement between the teeth is released when the load equal to or more than the predetermined value acts on the wiper pivot so that the inner cylinder is released from the outer cylinder so as to move the wiper pivot to the inner side of the vehicle body. In accordance with this structure, since an energy applied at a time of a collision or the like can be absorbed by a slide resistance at such a engagement portion, it is preferable.

Further, as an another more particular construction, the structure may be made in such a manner that the outer cylinder and the inner cylinder are connected by an engagement between a projection and a cutout portion, and the engagement between the projection and the cutout portion is released so that the inner cylinder is released from the outer cylinder so as to move the wiper pivot to the inner side of the vehicle body when the load equal to or more than the predetermined value acts on the wiper pivot. In accordance with this structure, since the energy applied at a time of a collision or the like can be absorbed by a mutual deformation when the engagement between the projection and the cutout portion is released, it is preferable.

Here, in this structure mentioned above, when the outer cylinder is formed by an elastic member so as to form the cutout portion, the absorption of the energy applied at a time of a collision or the like can be effectively performed by the elastic deformation of the cutout portion, so that it is preferable.

In the mean while, in the wiper device for the vehicle in accordance with the present invention, the structure may be made in such a manner that the bearing portion has an outer cylinder connected to a base member and an inner cylinder provided inside the outer cylinder and pivotally supporting the wiper pivot in a rotatable manner, and the outer cylinder is released from the base portion so as to move the wiper pivot to the inner side of the vehicle when the load equal to or more than the predetermined value acts on the wiper pivot. In accordance with this structure, since a certain motion can be obtained by a simple structure, it is preferable.

In the structure mentioned above, more particularly, the structure may be made such that the base portion and the outer cylinder are independent parts and are connected by an engagement between the projection and the cutout portion. In accordance with this structure, since the energy applied at a time of a collision or the like can be absorbed by a mutual deformation when the engagement between the projection and the cutout portion is released, it is preferable.

Here, in this structure mentioned above, when the outer cylinder is formed by an elastic member so as to form the cutout portion, the energy applied at a time of a collision or the like can be more effectively absorbed by the elastic deformation of the cutout portion, so that it is preferable.

Further, in the mean while, in the wiper device for the vehicle in accordance with the present invention, the structure may be made in such a manner that the base portion and the bearing portion are independent parts and are connected by an engagement between threaded portions, and the engagement between the threaded portions is released when the load equal to or more than the predetermined value acts on the wiper pivot, so that the bearing portion is released from the base portion so as to move the wiper pivot to the inner side of the vehicle body. In accordance with this structure, since a certain motion can be obtained by a simple structure, it is preferable.

Here, in the structure mentioned above, when the bearing portion is formed by a synthetic resin so as to form the threaded portion, the energy applied at a time of a collision or the like can be more effectively absorbed by collapsing of the threaded portion, so that it is preferable.

Further, in the mean while, in the wiper device for the vehicle in accordance with the present invention, the structure may be made in such a manner that a base portion and a bearing portion are independent parts and are connected by a shear pin, so that the shear pin is sheared and the bearing portion is released from the base portion so as to move the wiper pivot to the inner side of the vehicle body when the load equal to or more than the predetermined value acts on the wiper pivot. In accordance with this structure, since a more certain motion can be obtained by a simple structure, and the energy applied at a time of a collision or the like can be more effectively performed at a time of shearing of the shear pin, it is preferable.

Here, in the structure mentioned above, when the shear pin is provided so as to be integral with the bearing portion and engaged with the cutout portion provided in the base portion, it is preferable since the structure itself and an assembly thereof become simple.

Further, in the mean time, in the wiper device for the vehicle in accordance with the present invention, the structure may be made in such a manner that the base portion and the bearing portion are independent parts, the bearing portion is connected by use of press fit, and the press fit is released so that the bearing portion is released from the base portion so as to move the wiper pivot to the inner side of the vehicle when the load equal to or more than the predetermined value acts on the wiper pivot. In accordance with this structure, since a more certain motion can be obtained by a simple structure and the energy applied at a time of a collision or the like can be more effectively absorbed at a time of releasing the press fit, it is preferable.

DETAILED DESCRIPTION OF THE PREFERRED EMBODIMENTS

Each of embodiments in accordance with the present invention will be described in detail with respect to the drawings.

At first, a first embodiment in accordance with the present invention will be described.

Figure 1:
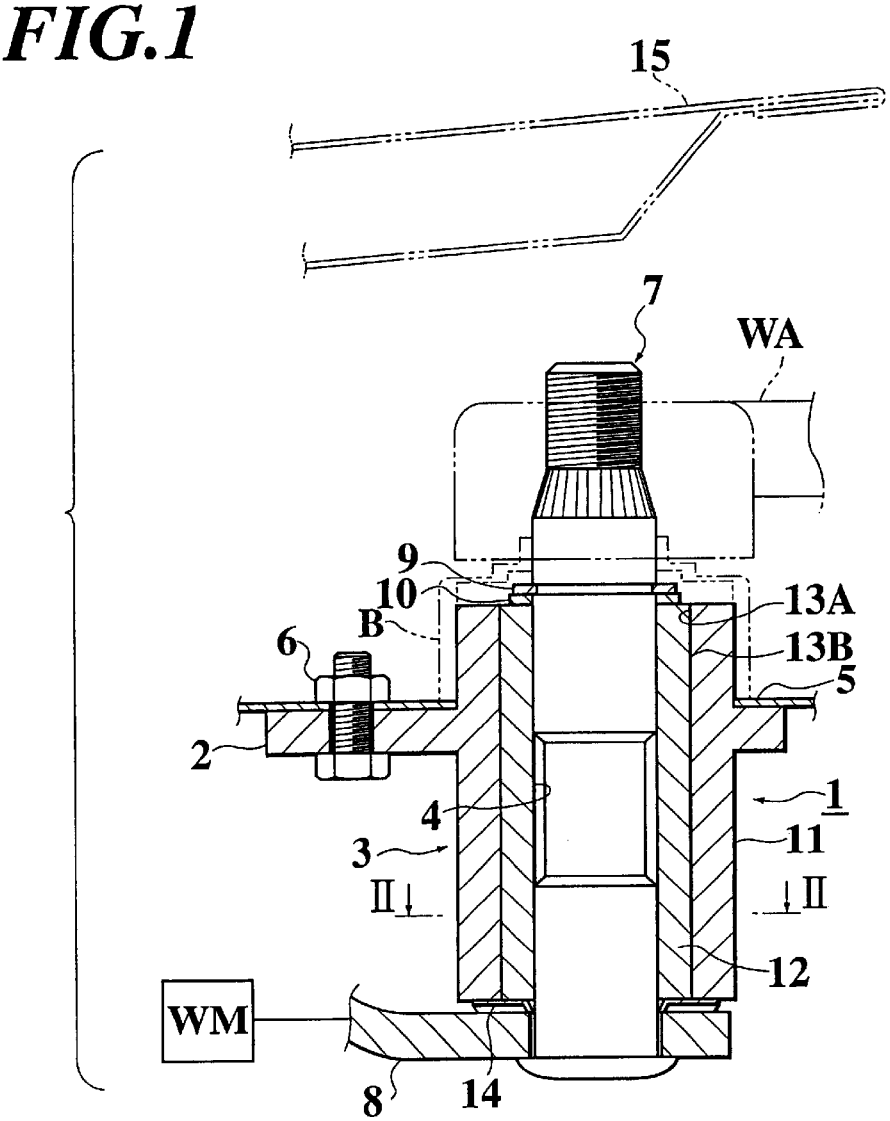
FIG. 1 is a cross sectional view which shows a state of attaching a pivot holder of a wiper unit of a wiper device for a vehicle in accordance with a first embodiment of the present invention to a vehicle body.
Figure 2:
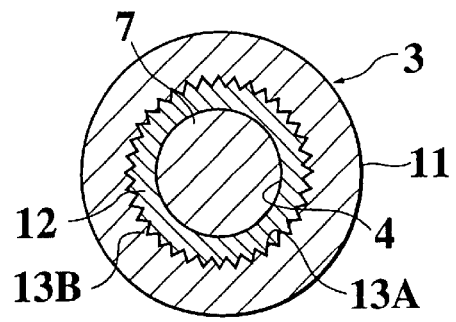
FIG. 2 is a cross sectional view along a line II—II in FIG. 1.

In FIGS. 1 and 2, a pivot holder 1 of a wiper unit of a wiper device for a vehicle in accordance with this embodiment is made of a metal and provided with a base portion 2 and a cylindrical bearing portion 3 connected to the base portion 2, and the base portion 2 is overlapped with a back surface of a vehicle body panel, for example, a cowl top panel 5 and fastened and fixed to the cowl top panel 5 by a bolt and a nut 6.

Then, a wiper pivot 7 is pivotally supported to the bearing portion 3 in a rotatable manner. That is, the wiper pivot 7 is rotatable around its pivot axis corresponding to a central axis of the wiper pivot 7, extending along a vertical direction in FIG. 1, of the wiper pivot 7.

The wiper pivot 7 is inserted to a bearing hole 4 of the bearing portion 3 from its lower side, a come-out prevention thereof is performed at an upper end of the bearing portion 3 through a come-out prevention ring 9 and a plain washer 10, and a wiper arm WA is connected to an upward projecting end portion of the wiper pivot 7.

On the contrary, a pivot arm 8 connected to a wiper motor WM is caulked and fixed to a lower end of the wiper pivot 7 through a drive transmission link (not shown).

Here, the bearing portion 3 is constituted by an outer cylinder 11 integrally formed with the base portion 2 and an inner cylinder 12 fitted to the outer cylinder 11 so as to pivotally support the wiper pivot 7 in a rotatable manner and prevent the wiper pivot 7 from coming out by the come-out prevention ring 9 and the plain washer 10.

Then, tooth portions 13A and 13B of a serration are respectively formed on an inner periphery of the outer cylinder 11 and an outer periphery of the inner cylinder 12. The inner cylinder 12 and the outer cylinder 11 are mutually engaged and connected in such a manner that the outer cylinder 11 and the inner cylinder 12 are set to be in a non-rotating state by the tooth portions 13A and 13B and in such a manner that the inner cylinder 12 can move downward to a lower side corresponding to an inner side of the vehicle body with respect to the outer cylinder 11 when a load equal to or more than a predetermined value acts on the wiper pivot 7 from an upper side corresponding to an outer side of the vehicle body in a direction of the pivot axis (a vertical direction in FIG. 1).

Here, in FIG. 1, reference numeral 14 denotes a spring washer elastically provided between the bearing portion 3 and the pivot arm 8, and reference symbol B denotes a sealing boot attached for covering an arrangement portion such as the come-out prevention ring 9 and the like.

In the case of applying the wiper unit of the wiper device for the vehicle in accordance with this embodiment mentioned above to the vehicle provided with the structure of the concealed wiper type, a rear end portion of an engine hood 15 extends so as to come near a lower portion of a front window panel (not shown).

Then, the upper portion of the wiper unit is covered with the rear end portion of the engine hood 15, and the upper end portion of the wiper pivot 7 is going to come near a lower surface of the rear end portion of the engine hood 15.

In the structure mentioned above, when a collision load acts downward on the rear end portion of the engine hood 15 from the upper side corresponding to the outer side of the vehicle body at a time of a collision of the vehicle, the rear end portion of the engine hood 15 deforms to the lower side corresponding to the inner side of the vehicle body and interferes with the upper end of the wiper pivot 7.

At this time, when the collision load equal to or more than the predetermined value acts on the wiper pivot 7 from the upper side, the inner cylinder 12 constituting the bearing portion 3 of the pivot holder 1 slides downward with respect to the outer cylinder 11, so that the wiper pivot 7 moves downward.

Accordingly, in the wiper device for the vehicle in accordance with this embodiment, a collapsing deformation stroke when the rear end portion of the engine hood 15 deforms downward is increased, thereby improving an absorption characteristic for a collision energy.

Then, since the collision energy can be absorbed by a sliding resistance at the engagement portion between the tooth portions 13A and 13B of the outer cylinder 11 and the inner cylinder 12 when the inner cylinder 12 slides downward in a releasing direction from the outer cylinder 11, the absorption characteristic for the collision energy can be further improved.

Further, in this embodiment, since the outer cylinder 11 and the inner cylinder 12 are engaged with and connected to each other by a so-called serration fitting as mentioned above such that the inner cylinder 12 can be released downward from the outer cylinder 11 under the predetermined load condition so that the wiper pivot 7 can move downward, a structure for moving downward of the wiper pivot can be made simple.

Here, in this embodiment, the structure is made such that the outer cylinder 11 and the inner cylinder 12 are engaged with and connected to each other by the serration fitting such that the inner cylinder 12 can be released downward from the outer cylinder 11 under the predetermined load condition, thereby performing the moving downward of the wiper pivot 7, however, it is of course possible to employ the other connecting structure such as a general spline fitting or the like as far as the same function can be obtained.

Further, in this embodiment, the pivot holder 1 is made of a metal, however, may be made of a synthetic resin or the like as far as the same strength, durability or the like can be secured.

Next, a second embodiment in accordance with the present invention will be described below.

In this embodiment, a basic structure is the same as that of the first embodiment, however, there is a main difference from the first embodiment in a point that the bearing portion 3 of the pivot holder 1 is separately constructed from the base portion 2.

Figure 3:
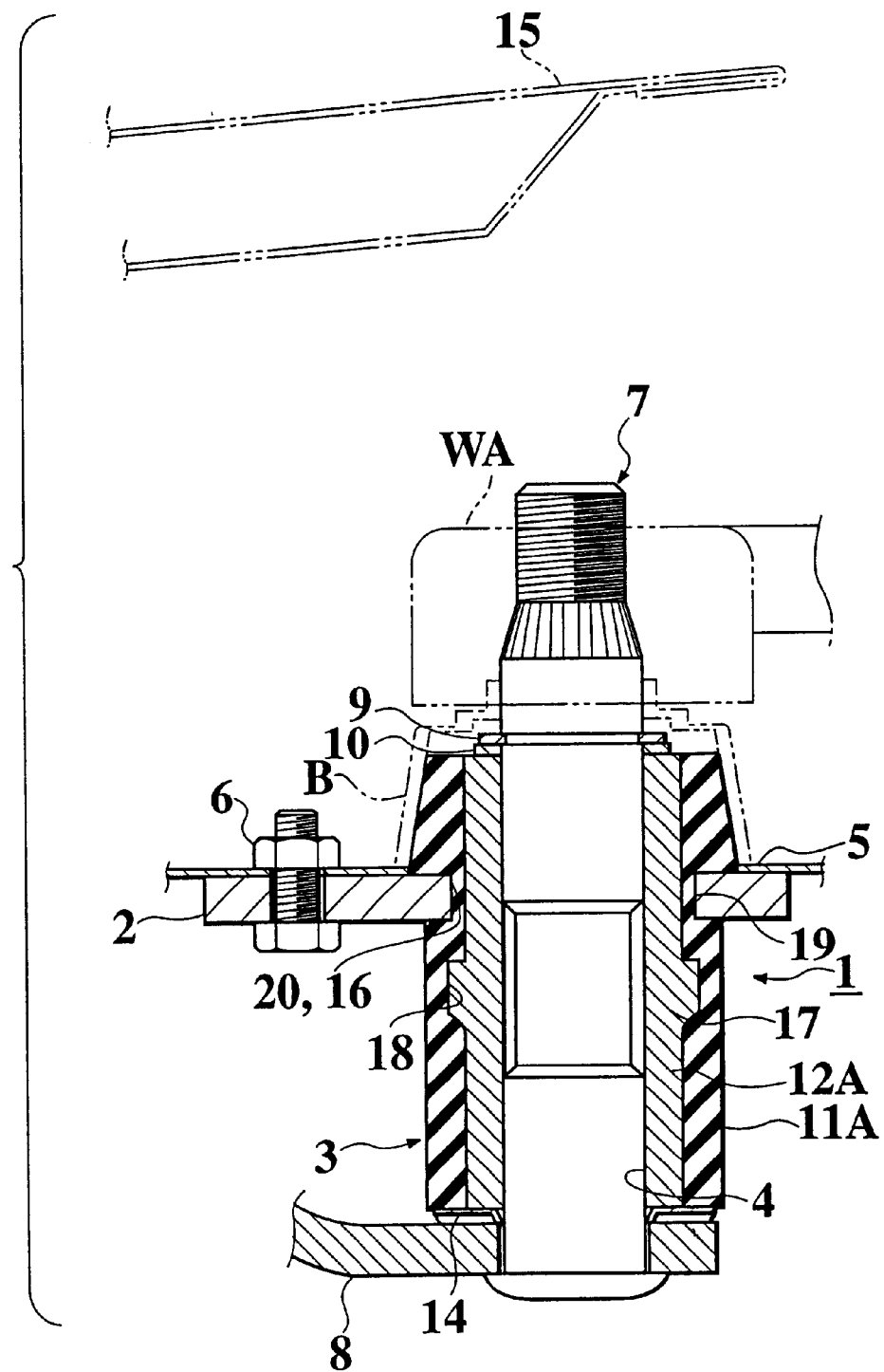
FIG. 3 is a cross sectional view which shows a state of attaching a pivot holder in accordance with a second embodiment of the present invention to a vehicle body.

Particularly, in FIG. 3, the bearing portion 3 pivotally supporting the wiper pivot 7 in a rotatable manner is constituted by an inner cylinder 12A made of a metal and preventing the wiper pivot 7 from coming out together with the come-out prevention ring 9 and the plain washer 10, and by an outer cylinder 11A made of a rubber corresponding to an elastic member and fitted to the inner cylinder 12A in a non-rotating manner. And the outer cylinder 11A is also fitted to an attaching hole 16 provided in the base portion 2 in a non-rotating manner.

Then, the outer cylinder 11A and the inner cylinder 12A are in an engaged state in such a manner that a projection 17 provided in a projecting manner on an outer periphery of the inner cylinder 12A corresponds to a cutout portion (groove portion) 18 provided on an inner periphery of the outer cylinder 11A.

Further, a cutout portion (groove portion) 19 is provided on an outer peripheral portion in the outer cylinder 11A at a portion above the engaging portion between the projection 17 and the cutout portion 18, and the cutout portion 19 and a projection 20 provided on a peripheral edge portion of the attaching hole 16 of the base member 2 are in an engaged state, so that the outer cylinder 11A and the base member 2 are attached to each other.

Here, the projection 17 provided on the outer periphery of the inner cylinder 12A and the cutout portion 18 provided on the inner periphery of the outer cylinder 11A are fitted and fixed in such a manner that the engagement therebetween is released with respect to the load equal to or more than the predetermined value acting on the wiper pivot 7 downward from the upper side in the direction of the pivot axis, and the inner cylinder 12A can be released downward from the outer cylinder 11A together with the wiper pivot 7.

Further, the cutout portion 19 of the outer cylinder 11A and the projection 20 provided in the peripheral edge portion of the attaching hole 16 in the base member 2 are fitted and fixed to each other in such a manner that the engagement therebetween is released with respect to the load equal to or more than the predetermined value acting on the wiper pivot 7 downward from the upper side in the direction of the pivot axis, and the outer cylinder 11A can be released downward from the base portion 2 together with the inner cylinder 12A and the wiper pivot 7.

That is, the attaching condition between the projection 17 provided on the outer periphery of the inner cylinder 12A and the cutout portion 18 provided on the inner periphery of the outer cylinder 11A, and the attaching condition between the cutout portion 19 of the outer cylinder 11A and the projection 20 provided in the peripheral edge portion of the attaching hole 16 in the base member 2 can be respectively set by a suitable manner in correspondence to a design need or the like, for example, which an engagement state should be first released. Of course, it may be set so that both engagement states are substantially simultaneously opened as occasion demands.

In the structure of this embodiment mentioned above, when the load equal to or more than the predetermined value acts on the wiper pivot 7 through the rear end portion of the engine hood 15 from the upper side corresponding to the outer side of the vehicle body to the lower side corresponding to the inner side of the vehicle body in a direction of the pivot axis (a direction downward from the above in FIG. 3) at a time of a collision of the vehicle or the like in the same manner as that of the first embodiment, the projection 17 on the outer periphery of the inner cylinder 12A is released from the cutout portion 18 on the inner periphery of the outer cylinder 11A, and the inner cylinder 12A is released downward from the outer cylinder 11A together with the wiper pivot 7, so that the wiper pivot 7 moves downward.

Of course, the structure may be set such that the cutout portion 19 on the outer periphery of the outer cylinder 11A is released from the projection 20 provided in the peripheral edge portion of the attaching hole 16 in the base portion 2, and the outer cylinder 11A is released from the attaching hole 16 of the base portion 2 together with the inner cylinder 12A and the wiper pivot 7, so that the wiper pivot 7 moves downward.

Accordingly, also in this embodiment, the collapsing deformation stroke downward of the rear end portion of the engine hood 15 can be increased and the absorption characteristic for the collision energy can be improved.

Further, in this embodiment, since the collision energy can be absorbed by an elastic deformation of the outer cylinder 11A at a time of moving downward of the wiper pivot 7, the absorption characteristic for the collision energy can be further improved.

Still further, since the inner cylinder 12A and the outer cylinder 11A, and the outer cylinder 11A and the base portion 2 are engaged with and fixed to each other so as to be releasable under the predetermined load condition, thereby performing the moving downward of the wiper pivot 7, the structure of the moving downward of the wiper pivot 7 can be made simple.

Here, in this embodiment, the structure is made such that the inner cylinder 12A and the outer cylinder 11A, and the outer cylinder 11A and the base portion 2 are engaged with and fixed to each other so as to be releasable under the predetermined load condition, however, it may be possible to employ only one structure thereof.

Furthermore, in this embodiment, the outer cylinder 11A is the elastic member and made of a rubber, however, it is of course possible to use the other material as far as the same function can be obtained.

Next, a third embodiment in accordance with the present invention will be described below.

Figure 4:
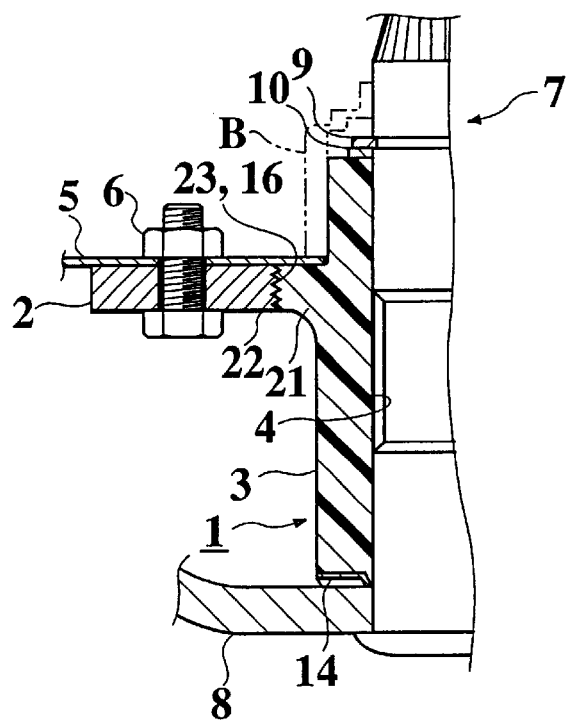
FIG. 4 is a cross sectional view which shows a state of attaching a pivot holder in accordance with a third embodiment of the present invention to a vehicle body.

A basic structure of this embodiment is the same as that of the first embodiment, however, as shown in FIG. 4, there is a main difference from the first embodiment in a point that a synthetic resin is used for the bearing portion 3 of the pivot holder 1 and the bearing portion 3 is separately formed from the metal-made base portion 2.

More particularly, in this embodiment, while a flange 21 is provided on the outer periphery of the bearing portion 3 in a projecting manner and a threaded portion 22 is formed on an outer peripheral surface of the flange 21, a threaded portion 23 is also formed in the attaching hole 16 of the base portion 2 and the flange 21 of the bearing portion 3 is engaged with the attaching hole 16 of the base portion 2 through the threaded portions 22 and 23.

Then, these threaded portions 22 and 23 are fixed in such a manner that the threaded portion 22 is collapsed by the threaded portion 23 with respect to the load equal to or more than the predetermined value acting on the wiper pivot 7 from the upper side in the direction of the pivot axis and the bearing portion 3 can be released downward from the attaching hole 16 of the base portion 2.

In the structure of this embodiment mentioned above, when the load equal to or more than the predetermined value acts on the wiper pivot 7 through the rear end portion of the engine hood from the upper side corresponding to the outer side of the vehicle body to the lower side corresponding to the inner side of the vehicle body in the direction of the pivot axis (a vertical direction in FIG. 4) at a time of a collision of the vehicle or the like, the threaded portion 22 of the flange 21 in the synthetic resin bearing portion 3 is collapsed, and the bearing portion 3 is released downward from the attaching hole 16 of the base portion 2 to the lower side corresponding to the inner side of the vehicle body.

Accordingly, also in this embodiment, in the same manner as that of the first embodiment, the wiper pivot 7 moves downward, thereby increasing the collapsing deformation stroke downward of the rear end portion of the engine hood 15 and improving the absorption characteristic for the collision energy.

Then, since the collision energy can be absorbed by collapsing the threaded portion 22 in the side of the bearing portion 3 by means of the threaded portion 23 in the side of the base portion 2 as mentioned above, the absorption characteristic for the collision energy can be further improved.

Further, in this embodiment, since the bearing portion 3 is engaged with and fixed to the attaching hole 16 of the base portion 2 so as to be releasable downward from the base portion 2 under the predetermined load condition, thereby performing the moving downward of the wiper pivot 7, the structure of the moving downward of the wiper pivot 7 can be made simple.

Here, in this embodiment, the bearing portion 3 of the pivot holder 1 is made of a synthetic resin, however, it is of course possible to use the other material as far as the threaded portion 21 can be collapsed in a relative relation with respect to the strength of the material used for the base portion 2.

Next, a fourth embodiment in accordance with the present invention will be described below.

Figure 5:
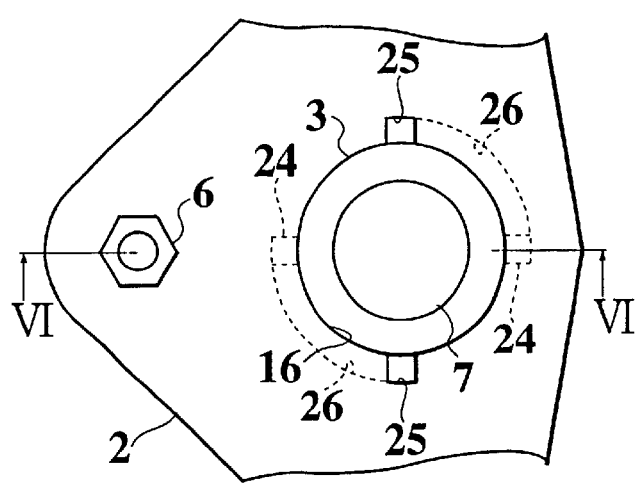
FIG. 5 is a plan view which shows a state of attaching a pivot holder in accordance with a fourth embodiment of the present invention to a vehicle body.
Figure 6:
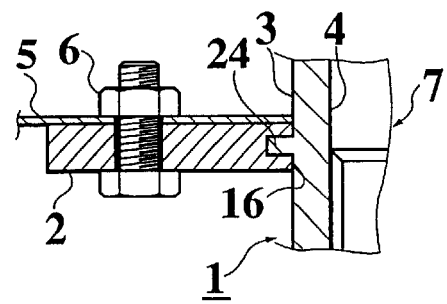
FIG. 6 is a partially cross sectional view along a line IV—IV in FIG. 5.

A basic structure of this embodiment is the same as that of the first embodiment, however, as shown in FIGS. 5 and 6, there is a main difference from the first embodiment in a point that the pivot holder 1 is made of a metal, the bearing portion 3 thereof is separately formed from the base portion 2, and the bearing portion 3 is fitted to the attaching hole 16 of the base portion 2 and connected by a shear pin 24, so that the shear pin 24 is sheared with respect to the load equal to or more than the predetermined value acting on the wiper pivot 7 from the upper side in the direction of the pivot axis and the bearing portion 3 is fixed to the base portion 2 so as to be released downward from the base portion 2.

More particularly, a pair of shear pins 24 are provided on the outer peripheral surface of the bearing portion 3 in a projecting manner, and a pair of pin dropping down cutouts 25 and a pair of engaging cutouts 26 formed in a blind alley extending from the pin dropping down cutouts 25 are respectively formed on an upper edge portion of the attaching hole 16 of the base portion 2 and a peripheral surface of the attaching hole 16 of the base portion 2 in correspondence to the shear pins 24. Then, the structure is made in such a manner that each of the shear pins 24 is surely engaged with the engaging cutout 26 so as to be prevented from coming out by inserting each of the shear pins 24 to the dropping down cutout 25 and moving each of the shear pins 24 along the engagement cutout 26 by rotating the bearing portion 3 to one direction so that each of the shear pins 24 reaches a terminal end of the engaging cutout 26 and is maintained to the engaging cutout 26.

In this embodiment mentioned above, in the same manner as that of the first embodiment, when the load equal to or more than the predetermined value acts on the wiper pivot 7 through the rear end portion of the engine hood 15 from the upper side corresponding to the outer side of the vehicle body to the lower side corresponding to the inner side of the vehicle body in the direction of the pivot axis (a vertical direction in FIG. 6) at a time of a collision of the vehicle or the like, the shear pins 24 are sheared, the bearing portion 3 is released downward from the attaching hole 16 of the base portion 2 and the wiper pivot 7 moves downward.

Accordingly, also in this embodiment, the collapsing deformation stroke downward of the rear end portion of the engine hood 15 can be increased and the absorption characteristic for the collision energy can be improved.

Then, in the case of this embodiment, since the collision energy can be absorbed due to the shearing load of the shear pin when the bearing portion 3 is released from the base portion 2, the absorption characteristic for the collision energy can be further improved.

Further, since the structure is made such that the shear pin 24 is sheared under the predetermined load condition, and the bearing portion 3 is connected so as to be releasable from the attaching hole 16 of the base portion 2, thereby performing the moving downward of the wiper pivot 7, the structure of the moving downward of the wiper pivot 7 can be made simple.

Here, in this embodiment, each of the shear pin 24 is integrally formed on the outer peripheral surface of the bearing portion 3, however, it is of course possible to make the shear pin as an independent part and to extend through the base portion 2 from a side portion of the base portion 2 so as to engage a distal end of each of the shear pins 24 with a side surface of the bearing portion 3 and fix it thereto.

Finally, a fifth embodiment in accordance with the present invention will be described below.

Figure 7:
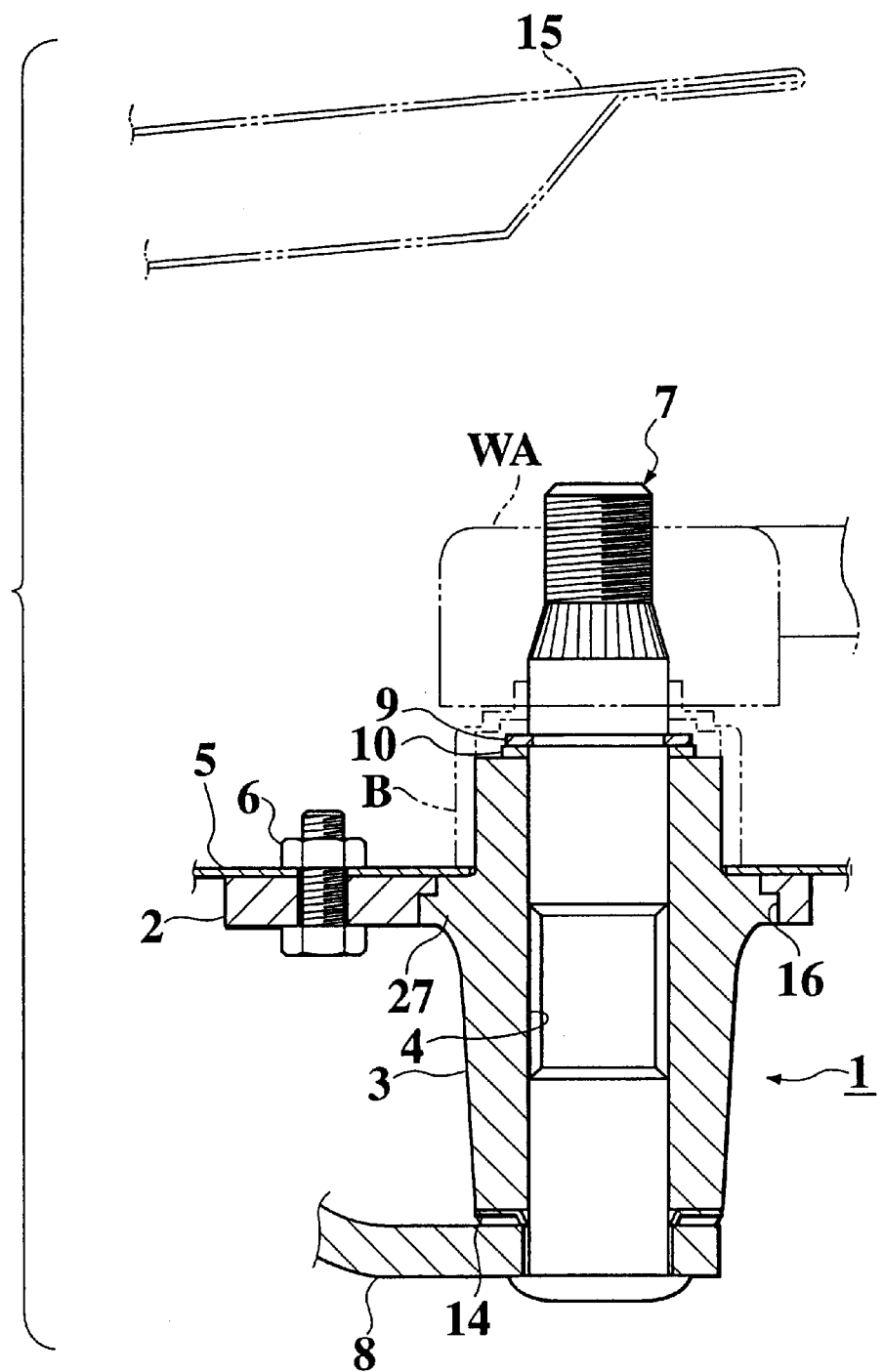
FIG. 7 is a cross sectional view which shows a state of attaching a pivot holder in accordance with a fifth embodiment of the present invention to a vehicle body.

A basic structure of this embodiment is the same as that of the first embodiment, however, as shown in FIG. 7, there is a main difference from the first embodiment in a point that the bearing portion 3 of the pivot holder is separately formed from the base portion 2.

Particularly, a flange 27 having a step portion with a small diameter is integrally provided above the outer periphery of the bearing portion 3 in a projecting manner, and a step portion corresponding to an outer peripheral shape of the flange 27 is formed in the attaching hole 16 of the base portion 2.

Then, the structure is made such that the flange 27 is press fitted to the attaching hole 16 from its lower side due to a thermal caulking, and the flange 27 can be released from the attaching hole 16 with respect to the load equal to or more than the predetermined value acting on the wiper pivot 7 from the upper side in the direction of the pivot axis.

In this embodiment mentioned above, when the load equal to or more than the predetermined value acts on the wiper pivot 7 through the rear end portion of the engine hood 15 from the upper side corresponding to the outer side of the vehicle body to the lower side corresponding to the inner side of the vehicle body in the direction of the pivot axis (a direction downward from the above in FIG. 7) at a time of a collision of the vehicle or the like, the flange 27 of the bearing portion 3 is released downward from the attaching hole 16 of the base portion 2 and the wiper pivot 7 moves downward in the same manner as that of the first embodiment.

Accordingly, also in this embodiment, the collapsing deformation stroke downward of the rear end portion of the engine hood 15 can be increased and the absorption characteristic for the collision energy can be improved.

Then, in this embodiment, since the collision energy can be absorbed due to the removing load between the flange 27 of the bearing portion 3 and the attaching hole 16 of the base portion 2, the absorption characteristic for the collision energy can be further improved.

Further, since the structure is made such that the flange 27 and the attaching hole 16 are attached by the press fit under the predetermined load condition, thereby performing the moving downward of the wiper pivot 7, the structure of the moving downward of the wiper pivot 7 can be made simple.

Here, in this embodiment, the flange 27 of the bearing portion 3 is press fitted to the attaching hole 16 from the lower side due to the thermal caulking, however, it is of course possible to press fit by a close fit or the like.

What is claimed is:

1. A wiper device for a vehicle comprising:
a wiper motor;
a wiper pivot connected to said wiper motor, said wiper pivot capable of rotating around a pivot axis thereof by using a drive force from said wiper motor and extending so as to project toward an outer side of said vehicle body; and
a pivot holder having a base portion attached to said vehicle body and a bearing portion including a first portion connected to said base portion and a second portion pivotally supporting said wiper pivot in a rotatable manner,
wherein said second portion is slidable relative to said first portion and said base portion, said first portion and said base portion remaining attached to and relatively stationary with respect to said vehicle body when a load equal to or more than a predetermined value acts on said wiper pivot;
wherein said first portion of said bearing portion comprises an outer cylinder connected to said base portion and said second portion comprises an inner cylinder provided inside said outer cylinder and pivotally supporting said wiper pivot in a rotatable manner, and wherein said inner cylinder is relatively movable with respect to said outer cylinder when said load equal to or more than said predetermined value acts on said wiper pivot; and
wherein said outer cylinder and said inner cylinder are connected by an engagement between teeth, and wherein said engagement between said teeth permits said inner cylinder to slide with respect to said outer cylinder when said load equal to or more than said predetermined value acts on said wiper pivot.

2. A wiper device for a vehicle, comprising:
a wiper motor;
a wiper pivot connected to said wiper motor, said wiper pivot capable of rotating around a pivot axis thereof by using a drive force from said wiper motor and extending so as to project toward an outer side of said vehicle body; and
a pivot holder having a base portion attached to said vehicle body and a bearing portion pivotally supporting said wiper pivot in a rotatable manner, wherein said base portion and said bearing portion are independent parts and are connected by a shear pin, and said shear pin is sheared so that said bearing portion is released from said base portion when said load equal to or more than said predetermined value acts on said wiper pivot.

3. A wiper device for a vehicle according to claim 2, wherein said shear pin is provided so as to be integral with said bearing portion and engaged with a cutout portion provided in said base portion.

4. A wiper device for a vehicle, comprising:

a wiper motor;

a wiper pivot connected to said wiper motor, said wiper pivot capable of rotating around a pivot axis thereof by using a drive force from said wiper motor and extending so as to project toward an outer side of said vehicle body; and a pivot holder having a base portion attached to said vehicle body and a bearing portion pivotally supporting said wiper pivot in a rotatable manner, wherein said base portion and said bearing portion are independent parts, said bearing portion is connected to said base portion by a press fit, and said press fit is released so that said bearing portion is released from said base portion when said load equal to or more than said predetermined value acts on said wiper pivot.

* * * * *